United States Patent Office 3,236,813
Patented Feb. 22, 1966

3,236,813
POLYURETHANES FROM MASKED
ISOCYANATES
Richard Wegler, Leverkusen, and Engelbert Kühle, Cologne-Stammheim, Germany, assignors to Farbenfabriken Bayer Aktiengesellschaft, Leverkusen, Germany, a corporation of Germany
No Drawing. Original application May 29, 1959, Ser. No. 816,684, now Patent No. 3,080,368, dated Mar. 5, 1963. Divided and this application June 22, 1962, Ser. No. 210,605
5 Claims. (Cl. 260—75)

This application is a divisional of parent application Serial No. 816,684, filed May 29, 1959, now Patent No. 3,080,368.

This invention relates to new compositions of matter which are capable of generating isocyanato groups. More particularly, this invention relates to novel compositions of matter which contain masked isocyanato groups that are released at elevated temperatures.

The reactivity of isocyanato groups with compounds containing active hydrogen containing groups has led to many commercial applications of organic isocyanates in the production of elastomers, adhesives, coating compositions and the like. It is often desirable to delay the reaction between the isocyanato groups and the active hydrogen containing compound until the components are in place and ready for use. This may be accomplished by employing as at least a portion of the isocyanate containing component, a compound which is either totally or partially inert to the active hydrogen containing component by having its isocyanato radicals masked or blocked by reaction with an active hydrogen containing compound such as a phenol monoalcohol, amide or the like. Compounds of this type split off the masking component at temperatures above about 130° C. to release the original isocyanato group for further reaction. The disadvantages of using these masked isocyanato groups are the necessity of employing elevated temperatures to release the isocyanate and the fact that the masking component is released to contaminate the finished product. Even though the masking component may be removed from the finished product by evaporation at an elevated temperature, elevated temperatures result in impaired mechanical properties of the product. Further, the loss of the masking component is uneconomical. Still further, it is necessary to prepare the isocyanate and then react it with phenol or other masking component in separate stages.

It is an object of this invention to provide improved masked isocyanates and a process for the preparation thereof. A further object of the invention is to provide a compound containing groups which are not reactive with a compound having hydrogen atoms determinable by the Zerewitinoff method at ordinary room temperature, but can be rendered reactive with such compounds by heating to an elevated temperature until —NCO groups are released. Another object of this invention is to provide an improved process for the preparation of polyurethane plastics.

The foregoing objects and others which will become apparent from the following description are accomplished in accordance with this invention, generally speaking, by providing masked isocyanates obtained from aromatic primary amines having one or more tertiary carbonamide groups in the ortho position with respect to an amine group with a carbonyl halide to obtain a complex which will generate an isocyanate radical capable of reacting with a compound containing hydrogen containing groups to form a polyurethane plastic at an elevated temperature. Thus, this invention contemplates masked isocyanates which are prepared by reacting an aromatic primary amine having a tertiary carbonamide group in the ortho position to the amine radical with a carbonyl halide to produce a thermally unstable product capable of generating an isocyanato radical.

The exact reaction mechanism in the process of this invention is not completely understood. It is believed, however, that the carbonyl halide reacts with the amino group to produce a masked isocyanate according to the equation given below, using o-anthranilic acid-dimethyl-amide and phosgene as examples:

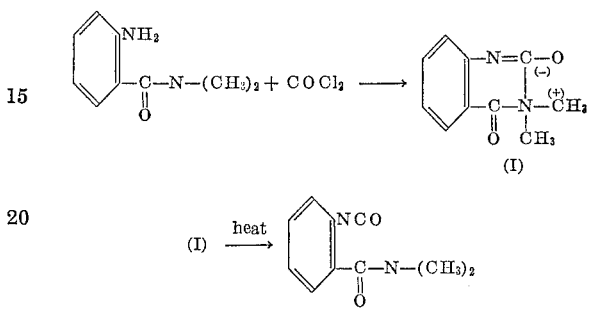

Any suitable aromatic primary amine having a carbonamide group in the ortho position to the amine group may be used, such as, for example:

Anthranilic acid dimethyl amide,
Anthranilic acid morpholide,
Anthranilic acid methyl, stearyl amide,
Anthranilic acid methyl, cyclohexyl amide,
Anthranilic acid dibutyl amide,
Thioanthranilic acid dibutyl amide,
4-chloro-anthranilic acid dibutyl amide,
2,4-diamino benzoic acid methyl, stearyl amide,
2,5-diamino benzoic acid dibutyl amide,
Diamino terephthalic acid bis-morpholide,
1-amino anthraquinone 2-carbonic acid dibutyl amide,
Hexahydroanthranilic acid-di-n-butyl amide.

As illustrated by the foregoing examples, the aromatic primary amine having a tertiary carbonamide group in the ortho position may be based on any suitable aromatic nucleus, such as, for example, naphthalene, anthracene and the like in addition to benzene and may be substituted by additional groups such as alkyl, for example, methyl, ethyl, propyl, butyl, amyl and the like; aryl, such as, for example, phenyl and the like; aralkyl, such as, for example, benzyl and the like; arkaryl, such as, for example, tolyl and the like; halo, such as, for example, chloro, bromo, iodo and the like as well as nitro groups. Further, the nitrogen atom in the tertiary carbonamide group may be substituted with any suitable aliphatic and/or cycloaliphatic radical, such as, alkyl, for example, methyl, ethyl, propyl, butyl and the like as well as cyclopentadienyl, and the like. Still further, the nitrogen atom of the tertiary carbonamide group may be incorporated into a ring system as in the morpholide group, said ring system containing, if desired, further hetero atoms such as oxygen and sulfur or it may be bonded to a carboxyalkyl group such as the stearyl radical. Further, tertiary thiocarbonamide groups may be employed as substituents, such as, for example, the dibutyl thiocarbonamide resulting from the substitution of thioanthranilie acid. If the aromatic nucleus of the starting compound contains additional amino groups which are not in the ortho position to a carbonamide group, then, in addition to reaction of the ortho amino group to form the isocyanate generating complex, an isocyanate radical will be formed on the compound. In this manner, it is possible to prepare organic isocyanates containing a masked isocyanato group which may be generated by heating the isocyanate without the accompanying release of a portion of the molecule. This development is important, for example, in the production of the coating compositions based on isocyanates and compounds containing active hydrogen containing groups which are reacted with an isocyanate to form a polyurethane plastic.

Any suitable carbonyl halide such as, for example, $COCl_2$, $COBr_2$, $COI_2$ and the like may be used for reaction with the aromatic amine tertiary carbonamide components.

According to the process of this invention, the aromatic primary amine containing a tertiary carbonamide group in the ortho position to the amine group is placed in any suitable organic solvent, such as, for example, xylene, toluene, benzene and the like and reacted with the carbonyl halid at a temperature below the disassociation temperature of the resulting complex. Any amino groups in the compound which are not adjacent to a tertiary carbonamide group will be reacted in this process to form an isocyanate. It is preferable to carry out the reaction with cooling at a temperature within the range of about 10 to about 150° C. The reaction is ususally carried out in the presence of an excess of the carbonyl halide and preferably from about 1.25 to about 2.5 mols of carbonyl halide per molar equivalent of amino groups.

The masked isocyanates produced in accordance with the process of this invention may be reacted with organic compounds containing active hydrogen containing groups to prepare polyurethane plastics by heating the masked isocyanate to a temperature within the range of about 130 to about 220° C. in the presence of said organic compound containing active hydrogen atoms and if desired in the presence of a catalyst, such as a tertiary amine. Alternately, where the masked isocyanates of the present invention contain additional free isocyanato groups, they may be reacted in a first step at a relatively low temperature with an organic compound containing active hydrogen containing groups to prepare an addition product containing masked isocyanato groups and, subsequently, further reacted by simply heating the initially prepared component to a temperature within the range of about 130 to about 220° C. if desired in the presence of a catalyst, such as a tertiary amine to release the masked isocyanato group for further reaction to prepare a polyurethane plastic. In other words, the masked isocyanates of this invention are reactive with any organic compound which will give a positive Zerewitinoff test. Any suitable organic compound containing groups containing active hydrogen atoms, said hydrogen atoms being reactive with isocyanato groups to form urethane groups, such as, for example, polyhydric polyalkylene ethers obtained from the condensation of an alkylene oxide and a minor amount of an hydroxyl containing component and, more particularly, ethylene oxide, butylene oxide, propylene oxide and the like, in conjunction with ethylene glycol, propylene glycol, butanediol, trimethylol propane, glycerol, hexanetriol and the like in addition to hydroxyl polyesters such as are obtained for example from the condensation of a polycarboxylic acid with a polyhydric alcohol and, more particularly, for example, the condensation products of adipic acid, succinic acid, sebacic acid and the like with ethylene glycol, butylene glycol, trimethylol propane, propylene glycol and the like. The compounds produced in accordance with the process of this invention may, therefore, be used in any suitable process heretofore known where compounds which generate isocyanato groups on the application of heat have proven useful heretofore. More particularly, these compounds may be mixed into a polyurethane base coating composition applied to a substrate and cured without release of volatile components by the application of heat.

Suitable procedures, reactants and the like for the preparation of polyurethane plastics may be found in United States Reissue Patent 24,514 to Hoppe et al, issued August 12, 1958; United States Patent 2,729,618 to Müller et al., issued January 3, 1956, and United States Patent 2,650,212 to Windemuth, issued August 25, 1953.

The following examples will serve to illustrate the process of the present invention:

EXAMPLE 1

A solution of about 21 grams of anthranilic acid-morpholide in about 50 milliliters of xylene is added dropwise to a solution of about 15 grams of phosgene in about 150 ml. of xylene at about 20° C. to about 23° C. under constant cooling. A deposit is formed. The total mass is brought to a temperature of about 125° C. in one hour and held at this temperature for about another one-half hour while fresh phosgene is constantly added. Almost all of the deposited solid will redissolve. The solution is cooled while being sparged with nitrogen. The solids are removed by filtration, and then the solvent is distilled off under vacuum. The bottoms product is about 12 grams of 2-isocyanato-benzoic acid-morpholide with a solidification point of about 150° C. to about 152° C.

EXAMPLE 2

A solution of about 35 grams of anthranilic acid-N-methyl stearyl amide in about 200 ml. of xylene is slowly added at about 10° C. to about 15° C. to a solution of about 20 grams of phosgene in about 150 ml. of xylene under continuous cooling with ice water. Continuously adding fresh phosgene, the solution is heated to about 120° C. in about 45 minutes and then held at this temperature for about another 30 minutes. It is then sparged with nitrogen until it has cooled down. After filtration, the solvent is distilled off under vacuum, and the bottoms product is about 30 grams of 2-isocyanato-benzoic acid-N-methyl stearyl amide with a solidification point of about 62° C. to about 64° C.

EXAMPLE 3

A solution of about 55 grams of anthranilic acid-di-n-butyl amide in about 100 ml. of xylene is added dropwise at about 10° C. to about 30° C. to a solution of about 50 grams of phosgene in about 200 ml. of xylene; a slurry of crystals is obtained. Under continuous addition of phosgene, the temperature of the reaction mixture rose to about 120° C. within about 45 minutes. After a temperature of about 120° C. has been reached, this temperature is maintained for about 30 minutes and then the solution is cooled down by passing nitrogen through it. The solvent is distilled off, and the end product is about 53 grams of a 2-isocyanato-benzoic acid-di-n-butyl amide with a solidification point of about 33° C.

EXAMPLE 4

A solution of about 57 grams of 2,4-diamino-benzoic acid-N-methyl stearyl amide in about 150 ml. of xylene is added dropwise to a solution of about 45 grams of phosgene in about 400 ml. of xylene held at about 10° C. A gelatinous deposit is formed which dissolves again when under continued addition of phosgene the temperature is brought up to about 125° C. Phosgenation is continued at this temperature for about another 15 minutes, the excess phosgene is removed by sparging with nitrogen, and the solution cooled down. After the xylene has been distilled off under vacuum, the remaining product is about 49 grams of the 2,4-diisocyanato-benzoic acid-N-methyl stearyl amide with a solidification point of about 57° C. to about 60° C.

EXAMPLE 5

A solution of about 15 grams of 2,5-diamino-benzoic acid-di-n-butyl amide in about 50 ml. of xylene is added dropwise to a solution of about 30 grams of phosgene in about 150 ml. of xylene at about 10° C. to about 15° C. A solid deposit is formed which goes back into solution if phosgenation is continued at an elevated temperature of about 120° C. After this temperature has been reached, phosgenation is continued for about another 15 minutes at this temperature. The product is sparged with nitrogen and then distilled under high vacuum. The bottoms product contains about 11 grams of the 2,5-diisocyanato-benzoic acid-di-n-butyl amide with a boiling point of about 192° C. to about 198° C. This is a yellow viscous liquid which turns into a wax-like solid at lower temperatures.

EXAMPLE 6

A solution of about 18 grams of hexahydroanthranilic acid-di-n-butyl amide in about 50 ml. of xylene is added dropwise at about 5° C. to a solution of about 20 grams of phosgene in about 200 ml. of xylene; the temperature rises to about 25° C. and the liquid turns yellow. Under further addition of phosgene, the temperature of the mixture rises to about 130° C. in about 30 minutes. The excess phosgene is removed by sparging with nitrogen at this temperature; and, after cooling, the solution is distilled under vacuum. The result is about 18 grams of a highly fluorescent viscous liquid with a crystallization point of about 211° C. to about 212° C.

EXAMPLE 7

This example illustrates the different reactivity of a free and a masked isocyanato group.

5 grams of 2,4-diisocyanato-benzoic acid dibutylamide are dissolved in 20 ml. of alcohol. A reaction occurs with spontaneous heating. After evaporation of the excess alcohol, 2 - isocyanato-4-(N-carbethoxy)-amino-benzoic acid dibutylamide of the formula $C_{19}H_{27}N_3O_3$ is obtained.
Calculated for C, 63.2%; H, 7.48%; N, 11.65%. Found: C, 63.0%; H, 7.47%; N, 11.31%.

By heating this compound with 20 ml. of alcohol with the addition of 1 ml. of hexahydrodimethylaniline to 175° C. for 5 hours, there is obtained 2,4-bis(N-carbethoxy)-amino-benzoic acid dibutylamide of the formula $C_{21}H_{33}N_3O_5$.
Calculated for C, 62.0%; H, 8.12%; N, 10.33%. Found: C, 62.6%; H, 7.97%; N, 10.49%.

EXAMPLE 8

Production of a polyurethane 100 grams of a 50 percent methylglycol acetate solution of 2,5-diisocyanato-benzoic acid dibutylamide are reacted with 120 grams of a 50 percent methylglycolacetate solution of a branched polyester with a basis of trimethylolpropane, phthalic acid, and adipic acid and having a hydroxyl content of 9 percent. After the addition of 3 percent of a tertiary amine (referred to the diisocyanate used) a reaction sets in with slight spontaneous heating. Upon baking at 220° for 1 hour, the masked isocyanate group reacts and an elastic film which is resistant to solvents is obtained.

It is to be understood that any of the above-defined amines, solvents, and carbonyl halides could have been used in the foregoing examples with satisfactory results.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:
1. A process for the preparation of a polyurethane which comprises incorporating an organic compound containing at least two active hydrogen containing groups with an organic isocyanate having at least one masked isocyanato group, said organic isocyanate obtained from the reaction of a carbonyl halide and an aromatic compound having a primary amino group and a tertiary carbonamide group in an ortho-position with respect to said amino group, and subsequently heating the mixture to a temperature of at least 130° C. to release the isocyanato group which reacts with the organic compound to form a polyurethane.

2. A process for the preparation of a polyurethane which comprises incorporating an organic compound containing at least two active hydrogen containing groups with an organic isocyanate having at least one masked isocyanato group and at least one free isocyanato group, said organic isocyanate obtained from the reaction of a carbonyl halide and an aromatic compound having a primary amino group and a tertiary carbonamide group in an ortho-position with respect to said amino group, and subsequently heating the mixture to a temperature of at least 130° C. to release the isocyanato group which reacts with the organic compound to form a polyurethane.

3. A process for the preparation of a polyurethane which comprises reacting an organic compound containing at least two active hydrogen containing groups with an organic isocyanate having at least one masked isocyanato group, said organic isocyanate obtained from the reaction of phosgene and an aromatic compound having a primary amino group and a tertiary carbonamide group in an ortho-position with respect to said amino group, and subsequently heating the mixture to a temperature of at least 130° C. to release the isocyanato group which reacts with the organic compound to form a polyurethane.

4. A process for the preparation of a polyurethane which comprises reacting an organic compound containing at least two active hydrogen containing groups with an organic isocyanate having at least one masked isocyanato group, said organic isocyanate obtained from the reaction of a carbonyl halide and anthranilic acid dialkyl carbonamide and thereafter heating the resulting mixture to a temperature of at least about 130° C. to release the isocyanato group which reacts with the organic compound to form a polyurethane.

5. A process for the preparation of a polyurethane which comprises reacting an organic compound containing at least two active hydrogen containing groups with an organic isocyanate having at least one masked isocyanato group, said organic isocyanate obtained from the reaction of a carbonyl halide and an aromatic compound having a primary amino group and a tertiary carbonamide group in an ortho-position with respect to said amino group, at a temperature of from about 10° C. to about 150° C. to form the organic isocyanate and thereafter heating the mixture to a temperature of between 130° C. and 220° C. to release the isocyanato group which reacts with the organic compound to form a polyurethane.

References Cited by the Examiner
UNITED STATES PATENTS

| | | | |
|---|---|---|---|
| 2,723,265 | 11/1955 | Stallmann | 260—75 |
| 2,865,940 | 12/1958 | Nobis et al. | 260—75 |
| 2,916,403 | 12/1959 | Calderwood. | |

LEON J. BERCOVITZ, *Primary Examiner.*

J. R. LIBERMAN, *Examiner.*